(12) United States Patent
Harms et al.

(10) Patent No.: US 12,277,260 B1
(45) Date of Patent: Apr. 15, 2025

(54) AUTOMATICALLY ADJUSTING DISPLAY-SCREEN POSE

(71) Applicant: Samsung Electronics Co., Ltd., Suwon-si (KR)

(72) Inventors: Brian Harms, San Jose, CA (US); Sergio Perdices-Gonzalez, Sunnyvale, CA (US); Curtis Aumiller, San Jose, CA (US); Ivan France, Saratoga, CA (US); Yufeng Wu, Sunnyvale, CA (US); Tara Sriram, Sunnyvale, CA (US); Akash Mittal, Champaign, IL (US); Thomas Brenner, Sunnyvale, CA (US); Eunseo Cho, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/527,899

(22) Filed: Dec. 4, 2023

(51) Int. Cl.
 *G06F 3/01* (2006.01)

(52) U.S. Cl.
 CPC .................. *G06F 3/011* (2013.01)

(58) Field of Classification Search
 CPC .......... G09G 5/003; G09G 2340/0464
 See application file for complete search history.

(56) References Cited

U.S. PATENT DOCUMENTS

| | | | |
|---|---|---|---|
| 8,091,842 B2 | 1/2012 | Thomas | |
| 8,939,500 B2 * | 1/2015 | Voigt | A47C 7/72 297/217.3 |
| 9,044,172 B2 * | 6/2015 | Baxi | A61B 5/1116 |
| 9,703,444 B2 * | 7/2017 | Nicholson | G06F 3/1423 |
| 11,004,422 B1 * | 5/2021 | Bull | G06F 16/9577 |
| 11,734,854 B2 | 8/2023 | Huelsdunk | |
| 2018/0253143 A1 * | 9/2018 | Saleem | G09G 5/003 |
| 2020/0380901 A1 * | 12/2020 | Ryu | G06F 3/1423 |
| 2023/0127218 A1 | 4/2023 | Hsieh | |
| 2024/0031619 A1 * | 1/2024 | Jayaram | G06F 18/22 |

FOREIGN PATENT DOCUMENTS

| | | |
|---|---|---|
| CN | 111815757 B | 4/2023 |
| CN | 116091577 A | 5/2023 |
| CN | 116402870 A | 7/2023 |

OTHER PUBLICATIONS

Shin et al., "Slow Robots for Unobtrusive Posture Correction" (CHI '19: ACM CHI Conference on Human Factors in Computing Systems), Apr. 2019.

Screen captures from YouTube video clip entitled "Roco—Robotic Computer Monitor" 4 pages, uploaded on Jan. 24, 2014 by user "gerbilproductions." Retrieved from internet: <https://www.youtube.com/watch?v=ljim-BW8Y8E&t=1s>, Jan. 2014.

(Continued)

*Primary Examiner* — Priyank J Shah

(57) ABSTRACT

In one embodiment, an apparatus includes determining a context associated with a current use of a display screen and determining, based on the determined context associated with the current use of the display screen, a subsequent pose of the display screen. The method further includes determining, by one or more actuators configured to control an arm coupled to the display screen, a current pose of the display screen to the determined subsequent pose.

20 Claims, 4 Drawing Sheets

(56) References Cited

OTHER PUBLICATIONS

Screen captures from YouTube video clip entitled "Dot Stand V1 (English Ver.)," 32 pages, uploaded on Aug. 7, 2022 by user "Dot Heal". Retrieved from internet: <https://www.youtube.com/watch?v=Xcs3YkJeCLQ>, Aug. 2022.

Kan, "This LG Monitor Can Continuously Move Itself to Meet Your Eye Level" PCMag (available at: https://www.pcmag.com/news/this-lg-monitor-can-continuously-move-itself-to-meet-your-eye-level), Aug. 2022.

"MediaPipe Iris: Real-time Iris Tracking & Depth Estimation," Posted by Andrey Vakunov and Dmitry Lagun, Research Engineers, Google Research (https://ai.googleblog.com/2020/08/mediapipe-iris-real-time-iris-tracking.html), Aug. 6, 2020.

\* cited by examiner

AUTOMATICALLY ADJUSTING DISPLAY-SCREEN POSE

TECHNICAL FIELD

This application generally relates to automatically adjusting a pose of a display screen.

BACKGROUND

Display screens are often used to facilitate interactions between a user and computing device. For example, a computer monitor connects to an associated computing device and can display content, such as content from applications. Display screens are typically flat, but can also be curved or can take other three-dimensional shapes. A computer device may be associated with two or more display screens; for example, a desktop or laptop computer may connect to two or more computer monitors, which may display the same content or may display different content. A display screen may be touch sensitive and/or may display input provided by a user through other devices, such as a mouse or a keyboard.

DESCRIPTION OF EXAMPLE EMBODIMENTS

The pose of a display screen, such as a computer monitor, can affect the ability of a user to use the display screen and/or affect the quality of the user's experience when using the display screen. For example, certain positions of a display screen may improve productivity for a user, e.g., a landscape monitor orientation may be useful for viewing a spreadsheet, while a portrait monitor orientation may be useful for reading a document. As another example, the position of a display screen can affect a user's posture, which can affect the user's overall health and wellbeing. As used herein, the pose of a display screen encompasses the position and orientation of the display screen.

The optimal pose of a monitor can vary greatly from person to person. The optimal pose of a monitor can vary greatly over time, even for the same person. Manually adjusting a monitor's pose is a time-consuming and sometimes difficult, iterative process that can disrupt user focus and productivity, and the variety of optimal monitor poses for even a single user (e.g., based on what the user is doing, or based on the user's current posture or seating height, etc.) mean that frequent manual adjustments may be required in order for the monitor to track its optimal pose for a user over time. For example, a monitor position that is optimal for a user at particular point in time will likely not be optimal at all future times, as the user's posture and/or use of the monitor changes. Moreover, because optimal monitor pose varies from person to person, having to manually adjust the pose of a display screen decreases the utility of a shared workspace, as users often have to adjust a monitor's pose in order to begin using the shared workspace, and any two user's preferred poses will likely conflict with each other.

Embodiments of this disclosure automatically adjust the pose of a display screen, such as a computer monitor, based on a detected context associated with the current use of the display screen. As explained below, the context can include content displayed on the screen, software or hardware processes executing on a computing device communicating with the display screen, preferences and/or the identity of a user using the display screen, a posture of the user using the display screen, and so on.

A display screen can be automatically moved by one or more actuators that control an arm attached to the display screen. The actuators can include one or more joints for adjusting the position of the display screen. In particular embodiments, a display screen may adjust its pose by translating in up to three dimensions and/or by rotating in up to three dimensions.

Figure 1:
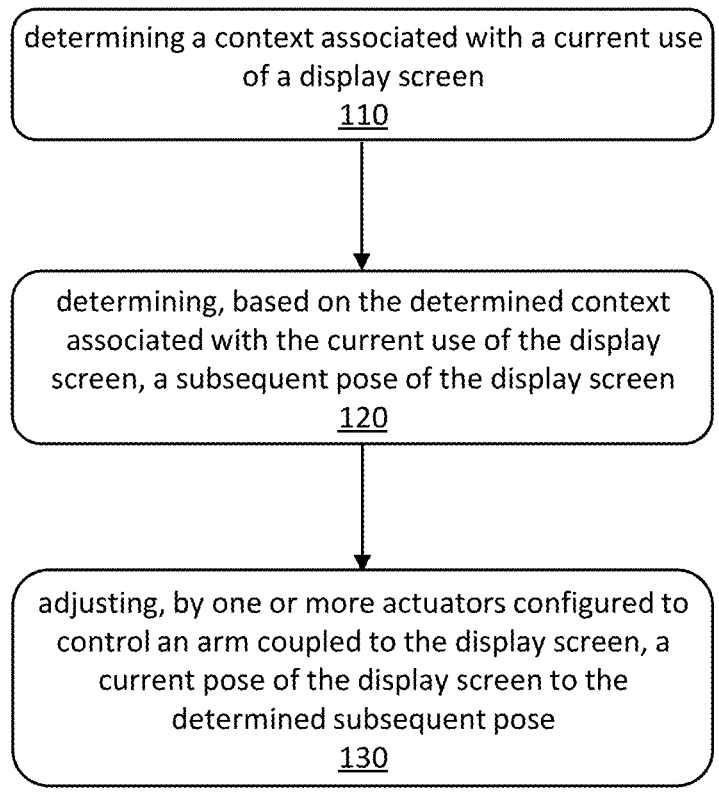
FIG. 1 illustrates an example method for automatically adjusting the position of a display screen.

FIG. 1 illustrates an example method for automatically adjusting the position of a display screen, such as a computer monitor. Step 110 of the example method of FIG. 1 includes determining a context associated with a current use of a display screen. A context associated with a current use of a display screen can include content displayed on the screen (e.g., the size, number, and/or position of windows displayed on the screen), processes executed by a computing device connected to the display screen (e.g., certain applications or routines executed by a computing device connected to the display screen), and/or information in the environment of the display screen (e.g., a pose of a user of the display screen, an identity of a user of the display screen, a time of day, etc.). For example, a particular context may be that a particular coding application is open and is docked to the bottom ⅔ of a display screen, and that a music player application is open and is docked to the upper ⅓ of the display screen. Other examples of contexts include the presence of a particular tab in a web browser; one or more system settings such as a system volume, display brightness, display resolution, etc.; and environmental contexts (e.g., user behavior or activities such as in a meeting, working out, cooking, etc. or locations such as in a kitchen, in an office, etc.).

In particular embodiments, one or more sensors associated with the display screen may be used to determine a context associated with a use of a display screen. For example, a camera (e.g., an RGB camera, an IR camera, etc.) may be used to capture one or more images of the environment in the vicinity of the display screen, and these images may be used to determine context associated with the display screen (e.g., facial recognition techniques may be used to determine the pose of a user and/or the identity of the user, etc.).

Step 120 of the example method of FIG. 1 includes determining, based on the determined context associated with the current use of the display screen, a subsequent pose of the display screen. The pose of the display screen may specify a position of the display screen (e.g., by specifying a value for each of up to three spatial dimensions) and/or an orientation of the display screen (e.g., by specifying a value for each of up to three rotational dimensions). The determined context may be a set of context specified by a workspace, or may be a triggering condition that activates the workspace, as explained more fully herein.

In particular embodiments, a subsequent pose for a display screen may be specified by a workspace associated with the display screen. For instance, a workspace may specify a set of one or more contextual conditions and a corresponding pose of the display screen. The particular pose may be specified in absolute terms (e.g., a specific numerical value for a position and/or orientation of the display screen) or in relative terms (e.g., a specified height and/or distance of the display screen relative to a user's face). In particular embodiments, a workspace may specify operational settings of an actuator (e.g., a minimum or maximum speed of actuation, a minimum or maximum range of motion, etc.). In particular embodiments, a workspace may include computer-related states, such as background wallpaper or a system setting.

Workspaces may be created by a user of the display screen. For example, a user may specify particular contexts (e.g., particular applications executing on a connected computing device; particular locations, numbers, or sizes of windows, etc.) in order to create a workspace. In particular embodiments, a user may specify a particular pose of the display screen to use in response to the context defined in the associated workspace or in response to a triggering condition. In particular embodiments, a user may manually specify a set of contexts and/or a corresponding pose of a display screen. In particular embodiments, a user may specify a set of contexts by activating a process that automatically identifies the current contexts and associated values for the contexts and creates a workspace. The user may also or alternatively specify a pose for a display screen by activating a process that automatically identifies the current pose and associates that pose with a workspace. For example, a user working with a two-monitor setup may open a spreadsheet application on a first monitor and orient that monitor in landscape orientation, and may open a coding application on a second monitor and orient the second monitor in a portrait application. The user may then activate a process to automatically capture the current contexts and pose of the two monitors, and create a workspace relating the context with the monitor poses. Then, when the contexts subsequently occur or when other triggering conditions occur, the workspace may be activated (either manually or automatically) and the monitors will then automatically moved to the poses specified in the workspace.

Activation of a workspace may be performed by any suitable input. For example, a workspace may be activated by interacting with (e.g., clicking) a workspace icon displayed on the display screen. As another example, a workspace may be activated based on an audio command (as sensed by, e.g., a microphone) or based on a gesture (as sensed by, e.g., a camera). As another example, a workspace may be activated by interacting with a physical button, e.g., on a base or side on a computer monitor. In particular embodiments, a workspace may be activated by selecting the workspace from a connected device, e.g., on a smartphone having a wired or wireless connection to a computing device connected to the display screen.

In particular embodiments, a workspace may be activated automatically in response to detecting the presence of a set of contexts identified in a workspace. For example, one or more sensors associated with the display screen may periodically obtain sensor data, and a connected computing device (or another computing device) may determine the current context from the obtained data. The determined context may be automatically compared to contexts specified in workspaces, and if a match between the detected context and a workspace's specified contexts occurs, then the workspace may be automatically activated.

In particular embodiments, a workspace may be activated automatically based on a condition for activating the workspace. For example, a workspace may be automatically activated if a particular device, such as a particular laptop, is connected to the display screen, or when a particular application is executed on a computing device, etc. As another example, a workspace may be activated in response to a specific video or audio being played, or in response to a user action or detected environmental context (e.g., location). In particular embodiments, multiple triggering conditions may be specified, and the workspace may be activated in response to any condition being met or all of the conditions being met. In these embodiments, activating the workspace may both activate the display-screen pose specified by the workspace and the contexts specified in the workspace.

In particular embodiment, activating a workspace may adjust the pose of a display screen and also adjust contexts to match those specified in the workspace, to the extent possible. For example, if a user is working in an image-editing application, and also has music player open, the user may save these applications as a context associated with the current display screen pose. The user may later activate this workspace, causing the display screen to move to the specified pose and causing the computer to launch the photo-editing application and the music playing application, and may place these applications' windows in the same locations as when the user created the workspace.

In particular embodiments, a set of workspaces may be associated with a particular display screen (e.g., a set of workspaces for a particular computer monitor may be associated with that monitor). In particular embodiments, a set of workspaces may be associated with a particular user, who may invoke the workspaces at any of multiple display screens (e.g., at their work computer, at their home office, etc.). In particular embodiments, workspaces may be accessible based on the identification of the current user. For example, a shared computing device in an office may identify a current user (e.g., based on facial recognition, the user's credentials such as a password for the computing device, etc.) and may then associate, or make available for selection, that particular user's workspaces for use with the computing device.

Figure 2:
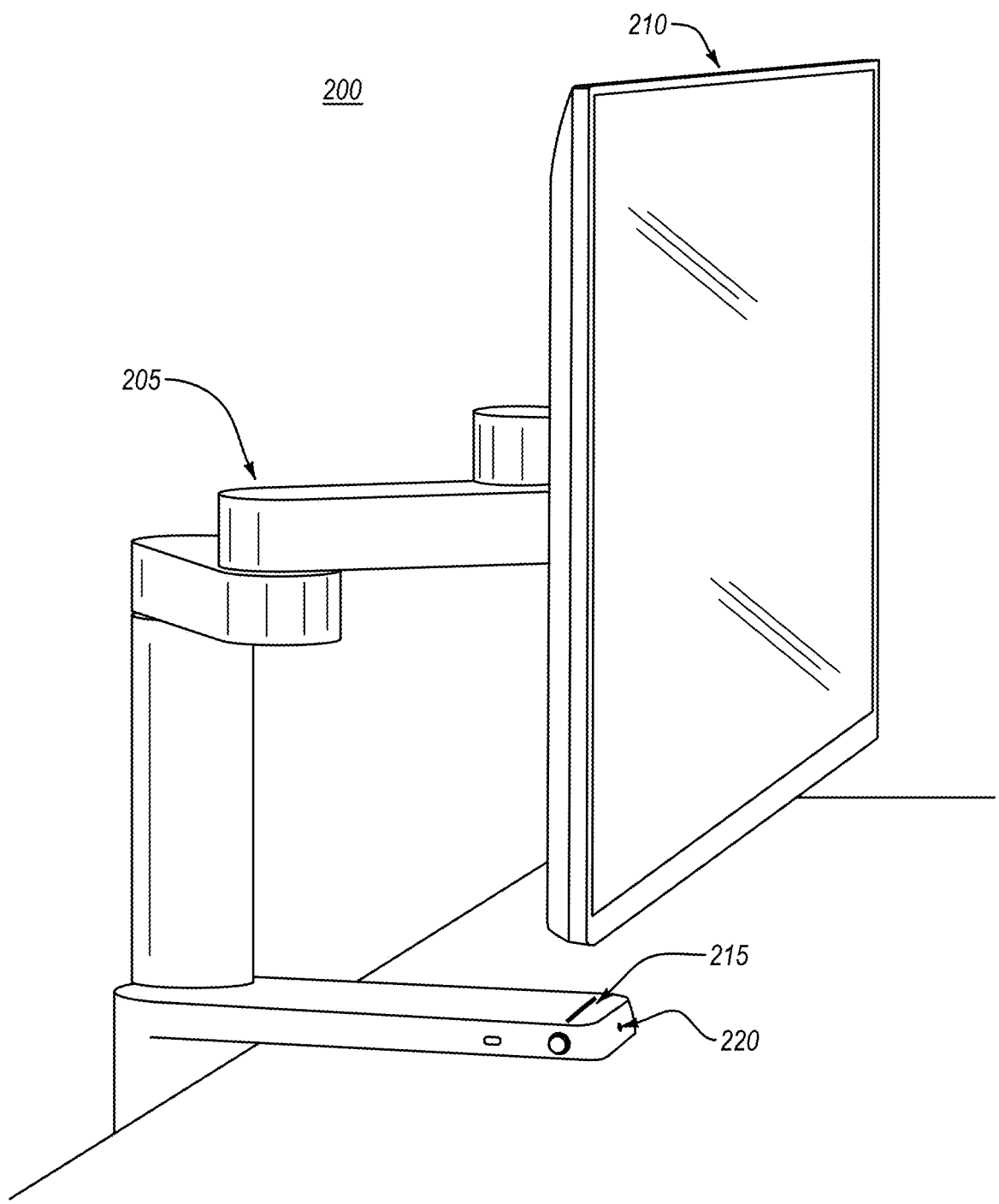
FIG. 2 illustrates an example actuator of an example display screen that is part of a computer monitor.

Step 130 of the example method of FIG. 1 includes adjusting, by one or more actuators configured to control an arm coupled to the display screen, a current pose of the display screen to the determined subsequent pose. In particular embodiments, if the determined subsequent pose is the current pose, then step 130 may include leaving the display screen in its current pose. FIG. 2 illustrates an example actuator of an example display screen of a computer monitor. In the example of FIG. 2, arm 205 of computer monitor 200 includes one or more actuators that can change the pose of display 210. Arm 205 includes the electronics and joints for actuating the movement of display 210, and in particular embodiments, arm 205 may also include electronics and wiring for powering components of monitor 200 (e.g., display 210) or for communicating (e.g., transmitting video and/or audio data) with a connected computing device. The example of FIG. 2 illustrates how sensors can be incorporated with a display screen; in the example of FIG. 2, a camera 220 for capturing images of the environment in front of display 210 is located in a base of monitor 200.

In particular embodiments, a display screen such as a computer monitor may be part of a system that includes a robotic arm capable of moving a mounted display in at least two axes, a connected computing unit which determines how the arm should move, a sensor such as a camera connected to the computing unit, algorithms on the computing unit that process the camera data and determine the most appropriate robot behavior, and the software and hardware capable of controlling the actuators (i.e. motor drivers, encoders or limit switches, etc.). The robotic arm may be attached to, or part of, a mount that attaches, for example, to a desk or to a wall.

In particular embodiments, a system including a display screen (e.g., a computer monitor) may include its own computing unit for performing certain computations relevant to camera processing and motor control. For example, a base or arm of a computer monitor may contain a computing unit, while a separate computing device (e.g., a personal computer) transmits signals to the display. In particular embodiments, all computer processing may be performed by a connected computing device. In particular embodiment, software for controlling aspects of embodiments disclosed herein (e.g., for creating or for activating a particular workspace, for manually adjusting a display-screen position, etc.), may be executed on any suitable device, such as a phone, tablet, laptop, or PC, and may execute on the computing device connected to the display screen.

While the example of FIG. 2 describes a computer monitor, this disclosure contemplates actuating any suitable display screen, including TVs, tablets, phones, and projectors.

In particular embodiments, the example method of FIG. 1 may be repeated automatically. For instance, the current context may be periodically or continuously evaluated, and when the context changes, and when that change corresponds to a triggering condition, the pose of the display screen may be adjusted. In particular embodiments, the example method of FIG. 1 may occur when a change in conditions occur (e.g., when a user enters a view of a camera, when a new application is opened on a connected computing device, etc.). In particular embodiments, the example method of FIG. 1 may be performed on demand, e.g., in response to a user request. In particular embodiments, some or all of the steps of the example method of FIG. 1 may be performed by a computing device connected to, or in communication with, the display screen (e.g., by a laptop or desktop computer connected to a computer monitor). In particular embodiments, some or all of the steps of the example method of FIG. 1, may be performed (at least in part) by another computing device. For example, a smartphone or other computing device may determine a context associated with a current use of a display screen, for example by capturing an image of the environment, by identifying a user of the display screen, etc.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 3:
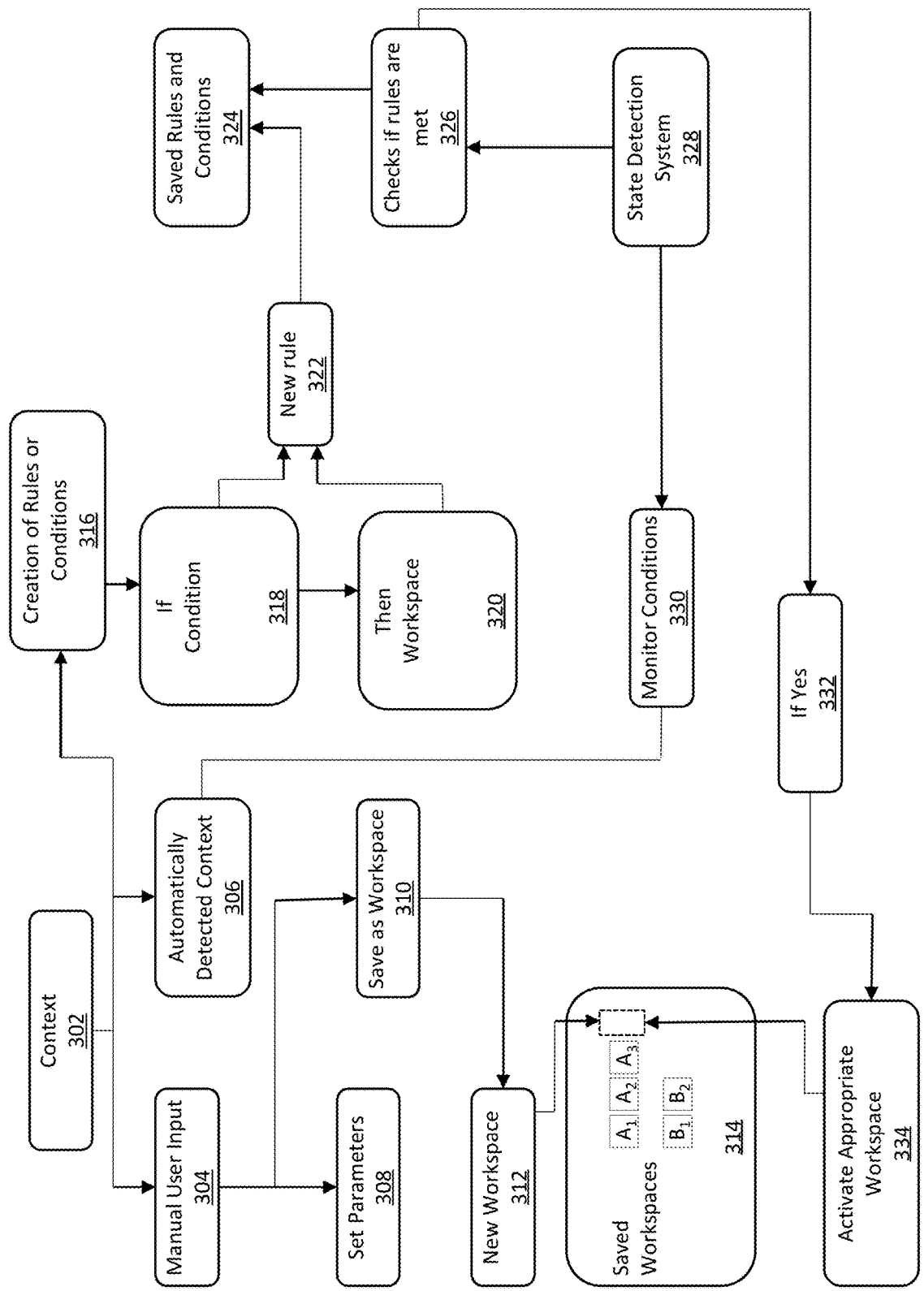
FIG. 3 illustrates an example flow chart that represents an embodiment of the example method of FIG. 1, among other things.

FIG. 3 illustrates an example flow chart that represents an embodiment of the example method of FIG. 1, among other things. As illustrated in FIG. 3, context 302 can be determined by manual user input 304 (e.g., the user specifying particular contexts) or may be an automatically detected context 306. When a user wishes to create a new workspace 312, the user can request the system capture the parameters of the current contexts (whether manually input or automatically detected), and the system then saves parameters 308 in step 310, resulting in new workspace 312. This new workspace is added to the saved workspaces 314, which may be specific to the display screen and/or to a particular user. For instance, as illustrated in the example of FIG. 3, saved workspaces 314 include multiple sets of saved workspaces A-C, with each set corresponding to a particular user (e.g., set A corresponds to user A, set B corresponds to user B, etc.). For example, if multiple users share a workstation, then each user can access their particular saved workspaces for that workstation. This disclosure contemplates that some or all workspaces in set of workspaces may be shared by one or more users, (e.g., workspace B2 may be the same as workspace A3, etc., in particular embodiments). The triggering conditions and actions taken (e.g., the specific workspace and/or pose to activate) can be user-specific, based on the user-specific workspaces associated with specific users.

As illustrated in the example of FIG. 3, rules and conditions 316 may be manually or automatically created. These rules may relate triggering conditions to saved workspaces. Rules may be in the form of if-then conditions, e.g., if conditions are met 318, then a particular workspace may be selected 320. New rules 322 are saved along with existing rules 324. A system state detection unit 328 (which may be executed by a computing device connected to the display screen, or by another computing device) monitors conditions 330 during a current use of the display screen. The state detection system 328 may check whether a rule is met 326 based on the monitored conditions. If yes, 332, then the appropriate workspace is activated. Here, a condition may result in a pose defined by a workspace if that condition is specified by a rule, even if the contexts described in the workspace are not otherwise fully met. In particular embodiments, in addition to checking whether rules are met, a state detection system 328 may monitor conditions 330 and determine whether the conditions correspond to particular contexts, and if so, whether those contexts collectively meet a workspace definition. If yes, then the corresponding pose specified by the workspace is activated.

In particular embodiments, a context of a display screen may include audio and/or frames of a video currently displayed on the screen, and/or changes over time in audio or among frames of a video. For example, particular embodiments may analyze video frames on the monitor to determine where a horizontal element, such as the horizon, is located in the video. The display screen may then move while displaying the video so that the displayed horizon remains horizontal through the video. For example, if a video was captured by a camera that changed from portrait to landscape mode during capture of the video, then when the video is played, an arm may rotate the display screen accordingly so that the video's horizon remains horizontal. In particular embodiments, video or audio may be analyzed by a passthrough, e.g., of a monitor's input, that can process the video or audio input. In particular embodiments, rather than analyzing all data in a video or audio stream, particular embodiments may perform lightweight processing of the stream by determining one or more characteristics of the stream (e.g., how stable is the video, how many pixels change color or brightness between frames, whether edges between objects change position between frames, etc.).

As another example of changing display pose in response to detected content, a display screen may provide enhanced or complimentary video effects, such by shaking when an earthquake is depicted on screen (e.g., shaking based on the frequency and amplitude of the shaking in the video frames), or by suddenly moving toward the user in response to a jump-scare shown in a movie. In particular embodiments, a user or other entity may enable or disable motion-based functionality based on analyzing audio or video content.

In particular embodiments, one or more rules may be used to determine a display's pose in response to detected content displayed on the display. For example, the length of a video may be used to determine a pose, e.g., according to a rule specifying that a portrait mode is preferred for relatively longer videos. As another example, a rule may specify that the display pose should match the orientation of a captured video (e.g., a video captured in landscape orientation should be displayed by a display screen in landscape orientation).

As described above, a user's posture may be one context that is used to determine a pose of a display device. The user's posture can include the height of the user and the distance of the user relative to the display screen. Ergonomic best practices suggest a specific range of optimal distances between a screen and user, a specific range of optimal heights of the user's eyes relative to the display screen, and a specific optimal pose of the user (e.g., sitting straight, feet on the floor, etc.). A display screen may be adjusted so as to encourage or support good posture by the user of the display screen.

The user's posture may be detected or determined by any suitable technique. For example, the user's posture may be based on the user's head height or eye level relative to the user's maximum head height or eye level. For example, if the user's head height is lower than the user's maximum head height (within some tolerance, in particular embodiments), then the user may be determined to have suboptimal posture. In particular embodiments, a distance between the user's face and the display screen may be determined, and this distance may be taken into account when determining the user's posture (e.g., to ensure the user is not slumping over or leaning back, or to ensure that the user's face is an optimal distance from the display screen). In particular embodiments, the distance between the user's face and the display screen may be determined by techniques described in U.S. patent application Ser. No. 18/527,756, which is incorporated by reference in its entirety herein. In particular embodiments, a display screen's pose may be adjusted only when that adjustment would exceed a certain threshold movement (e.g., to avoid many small movements to the screen), only when the adjustment is more than a certain threshold duration away from the previous adjustment (e.g., to avoid frequently moving the screen), or when the user's posture is considered settled, i.e., the user's posture is not currently changing or has stayed in its current position past a threshold duration.

In particular embodiments, a computing device may provide feedback to a user based on the user's detected posture. The feedback may be visual feedback, audio feedback, haptic feedback (e.g., vibration), etc. In particular embodiments, the feedback may be provided by device including the display screen. For instance, in the example of FIG. 2, monitor 200 can include a feedback LED 215, which can provide different colors or intensity, etc., to communicate the user's detected posture to the user. For example, LED 215 may illuminate with a green color when the user is detected as having good posture, and may illuminate with red color when the user is detected as having poor posture. In particular embodiments, LED 215 may include multiple LEDs, and the number of LEDs illuminated may correspond to the quality of the user's posture at a particular time.

In particular embodiments, an AI optimization algorithm may monitor a user's posture (e.g., head position) over time while the display screen is slightly adjusted, in order to discover one or more monitor positions that result in better posture quality over time. For example, particular embodiments can make small adjustments to explore a variety of display poses over time, while simultaneously measuring, e.g., the height of the user's head (as an approximation of posture quality, making the assumption that a higher head position while seated will result in a more upright posture). In particular embodiments, the adjustments may be with respect to a specific optimal location of the display screen relative to the user, e.g., as based on ergonomic recommendations. Such recommendations may include a range of relative positions between a user and a display screen, and the adjustments may explore the space within that range.

The system can collect pose and user response data and use that data as training data to find correlations in posture quality and display pose to determine the optimal monitor pose relative to the user's face. For example, an AI model, such as a reinforcement learning algorithm, may take as input the user's current head pose (orientation and location) along with historical data describing that user's previous reactions to display screen poses or adjustments. For example, if a certain pose or adjustment previously resulted in improved posture, then this pose may be given a positive weight. In contrast, if the user's posture declined, or if the user returned the monitor to its previous pose, then the pose may be given a negative weight. The AI model can also take into account target goals of the user, e.g., an ideal posture of the user, an ideal distance between the display and the user's face, etc. Using these inputs, the AI model can then determine an adjustment to the current monitor pose in order to improve the user's posture. As described above, by using this AI model, user-specific display-pose data can be used to customize the optimal display pose for a user at a particular time, given the user's ideal posture and the user's previous responses to monitor positions. In particular embodiments, a duration since the last monitor position may be used to determine whether to adjust the position of the monitor, e.g., to ensure the monitor does not move too frequently and decrease the user's experience.

As an example of an adjustment process, particular embodiments may start by identifying the maximum deviation from a recommended position that a monitor should be allowed to be moved in order to still remain within recommended ergonomic distance and height specifications. Over time, the monitor will adjust its pose from these recommended values, and the user's eye level while using the monitor at each new experimental position may tracked. This data may be provided to an AI model (or may be used without an AI model), and the monitor pose that results in the user adopting a posture where the eye level is the highest may be considered as an ideal position for the user. If there is more than one ideal position, then the monitor position that is closest to the monitor's default position for that user may be selected as the best position for that user.

In particular embodiments, an AI model may periodically update and evaluate a user's historical response data to display-screen poses, even after optimal distance and height values are calculated for a user. This accommodates the possibility that a user's optimal spatial relationship to their monitor may change over time.

Figure 4:
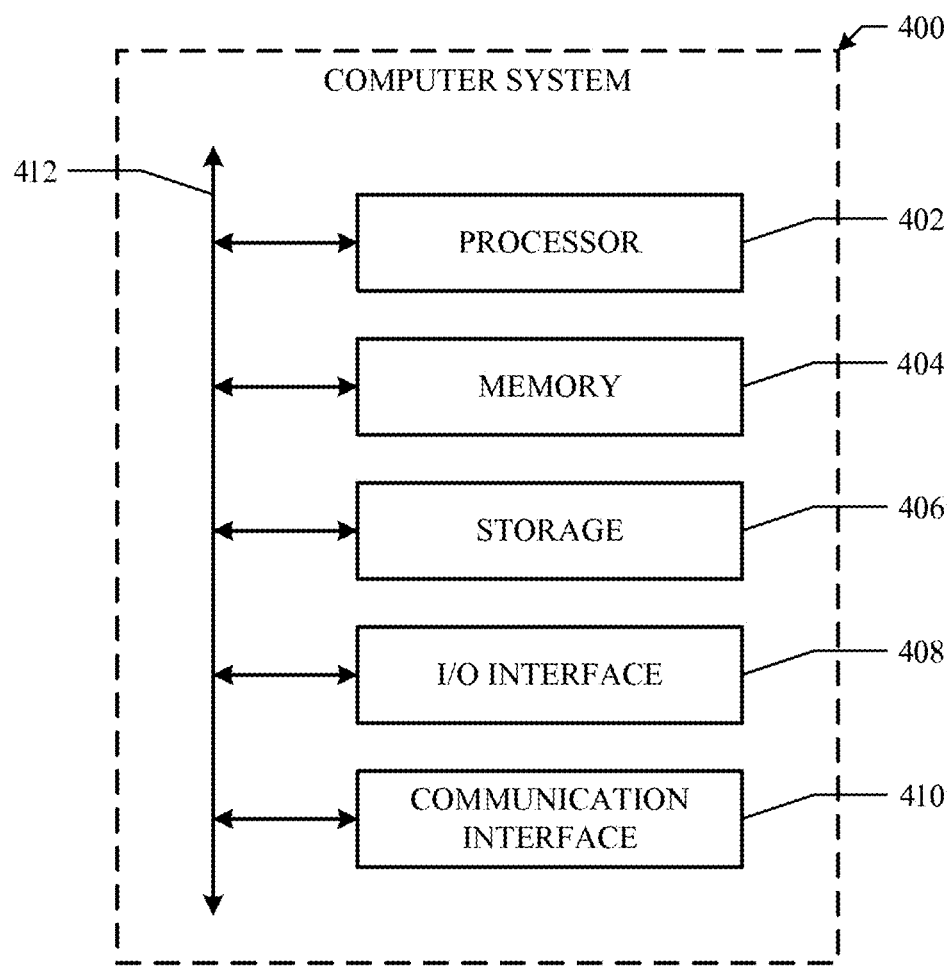
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
    determining a context associated with a current use of a display screen, wherein the context comprises an identification of one or more software applications displayed on the display screen;
    determining, based on the determined context associated with the current use of the display screen and from a workspace (1) specific to a current user of the display screen and (2) specifying a particular pose for the current context and the current user, a subsequent pose of the display screen; and adjusting, by one or more actuators configured to control an arm coupled to the display screen, a current pose of the display screen to the determined subsequent pose.

2. The method of claim 1, wherein the context associated with the current use of the display screen comprises content displayed on the display screen.

3. The method of claim 2, wherein the content comprises a video content, and the context is further based on a change among a plurality of frames of the video content.

4. The method of claim 1, wherein the context associated with the current use of the display screen comprises a process executed by a computing device transmitting signals to the display screen.

5. The method of claim 1, wherein:
the context associated with the current use of the display screen comprises a set of contexts identified in a workspace for that display screen; and
determining the subsequent pose of the display screen comprises determining a pose specified by the workspace.

6. The method of claim 5, wherein the workspace is one of a plurality of workspaces, each workspace specifying a particular set of contexts for the display screen and a corresponding pose of the display screen for that particular set of contexts.

7. The method of claim 6, further comprising:
associating a first set of the plurality of workspaces with a first user of the display screen; and
associating a second set of the plurality of workspaces with a second user of the display screen.

8. The method of claim 1, wherein the context associated with the current use of the display screen comprises a posture of a user of the display screen.

9. The method of claim 8, wherein the posture of the user comprises one or more of (1) a height of a portion of the user or (2) a distance between the display screen and the user's face.

10. The method of claim 8, wherein determining, based on the determined context associated with the current use of the display screen, a subsequent pose of the display screen comprises determining, by a reinforcement learning model and based on (1) the posture of the user and (2) a previous response by the user to a change of pose the display screen, the subsequent pose of the display screen.

11. The method of claim 8, further comprising providing feedback to the user regarding the posture of the user.

12. An apparatus comprising:
a display screen;
an arm coupled to the display screen and comprising one or more actuators for controlling movement of the arm; and
one or more non-transitory computer readable storage media storing instructions; and one or more processors coupled to the non-transitory computer readable storage media, the one or more processors operable to execute the instructions to:
determine a context associated with a current use of a display screen, wherein the context comprises an identification of one or more software applications displayed on the display screen;
determine, based on the determined context associated with the current use of the display screen and from a workspace (1) specific to a current user of the display screen and (2) specifying a particular pose for the current context and the current user, a subsequent pose of the display screen; and
adjust, by controlling the one or more actuators, a current pose of the display screen to the determined subsequent pose.

13. The apparatus of claim 12, wherein the context associated with the current use of the display screen comprises content displayed on the display screen.

14. The apparatus of claim 13, wherein the content comprises a video content, and the context is further based on a change among a plurality of frames of the video content.

15. The apparatus of claim 12, wherein the context associated with the current use of the display screen comprises a process executed by a computing device transmitting signals to the display screen.

16. The apparatus of claim 12, wherein:
the context associated with the current use of the display screen comprises a context identified in a workspace for that display screen; and
determining the subsequent pose of the display screen comprises determining a pose specified by the workspace.

17. The apparatus of claim 12, wherein the context associated with the current use of the display screen comprises a posture of a user of the display screen.

18. The apparatus of claim 17, wherein one or more processors are further operable to execute the instructions to determine, by a reinforcement learning model and based on (1) the posture of the user and (2) a previous response by the user to a change of pose the display screen, the subsequent pose of the display screen.

19. One or more non-transitory computer readable storage media storing instructions and coupled to one or more processors that are operable to execute the instructions to:
determine a context associated with a current use of a display screen, wherein the context comprises an identification of one or more software applications displayed on the display screen;
determine, based on the determined context associated with the current use of the display screen and from a workspace (1) specific to a current user of the display screen and (2) specifying a particular pose for the current context and the current user, a subsequent pose of the display screen; and
adjust, by controlling one or more actuators configured to control an arm coupled to the display screen, a current pose of the display screen to the determined subsequent pose.

20. The media of claim 19, wherein the context associated with the current use of the display screen comprises content displayed on the display screen.

* * * * *